(12) United States Patent
Matsumoto

(10) Patent No.: US 6,981,681 B2
(45) Date of Patent: Jan. 3, 2006

(54) LOCK MECHANISM FOR SEAT SLIDE DEVICE AND ASSEMBLING METHOD THEREOF

(75) Inventor: Tadashi Matsumoto, Shizuoka (JP)

(73) Assignee: Fuji Kiko Co., Ltd., Kosai (JP)

( * ) Notice: Subject to any disclaimer, the term of this patent is extended or adjusted under 35 U.S.C. 154(b) by 0 days.

(21) Appl. No.: 10/617,730

(22) Filed: Jul. 14, 2003

(65) Prior Publication Data

US 2004/0011940 A1 Jan. 22, 2004

(30) Foreign Application Priority Data

Jul. 19, 2002 (JP) ............... 2002-210527

(51) Int. Cl.
*F16M 13/00* (2006.01)
(52) U.S. Cl. ............ 248/424; 248/429; 248/430; 297/344.1
(58) Field of Classification Search ............ 248/429, 248/430, 419, 420, 421, 422, 423, 424; 297/344.1, 297/341
See application file for complete search history.

(56) References Cited

U.S. PATENT DOCUMENTS

| | | | | |
|---|---|---|---|---|
| 4,813,643 A | * | 3/1989 | Nihei | ............ 248/430 |
| 5,028,028 A | * | 7/1991 | Yamada et al. | ............ 248/430 |
| 5,192,045 A | * | 3/1993 | Yamada et al. | ............ 248/430 |
| 5,285,993 A | * | 2/1994 | Kamata et al. | ............ 248/429 |
| 5,358,207 A | * | 10/1994 | West | ............ 248/430 |
| 5,971,342 A | | 10/1999 | Sakai et al. | |
| 6,435,465 B1 | | 8/2002 | Yamada et al. | |

FOREIGN PATENT DOCUMENTS

| | | |
|---|---|---|
| EP | 1 048 512 A2 | 11/2000 |
| FR | 2 801 012 A1 | 5/2001 |
| GB | 2317558 * | 1/1998 |

* cited by examiner

*Primary Examiner*—Anita King
*Assistant Examiner*—Tan Le
(74) *Attorney, Agent, or Firm*—Foley & Lardner LLP

(57) ABSTRACT

A seat slide device includes a lock mechanism swingably supported to a bracket and having a lock piece with lock pawls rotatively biased by a coil spring and engaged/disengaged from lock openings of a lower rail, a spring protrusion formed with the bracket and catching one end of the coil spring, a lock releasing lever formed with the lock piece and catching another end of the coil spring, and a provisional spring protrusion formed with the lock piece and located in the neighborhood of the spring protrusion and catching one end of the coil spring provisionally.

7 Claims, 4 Drawing Sheets

LOCK MECHANISM FOR SEAT SLIDE DEVICE AND ASSEMBLING METHOD THEREOF

BACKGROUND OF THE INVENTION

The present invention relates to a lock mechanism for a slide device for use, particularly, in vehicle seats and an assembling method thereof.

The seat slide device is constructed to have a seat cushion with a seat back movable in the vehicle longitudinal direction, thereby allowing a seat occupant or passenger to carry out adjustment for an optimum seating position.

Typically, the seat cushion is fixed to an upper rail slidably engaged with a lower rail fixed to a vehicle-body floor. Lock openings are formed in a side face of the lower rail at predetermined intervals in the longitudinal direction thereof. Connected to the upper rail is a lock mechanism comprising a bracket having a lock piece which is provided with a lock pawl engaged/disengaged from the lock openings and is rotatively biased by a coil spring.

The lock piece comprises an operation rod extending forward downward of the seat cushion. When rotating the operation rod, the lock piece is forcibly rotated against a spring force to disengage the lock pawl from a lock opening, obtaining lock release. When releasing the operation rod, the lock piece is returned to an original position by a spring force to engage the lock pawl in another lock opening.

SUMMARY OF THE INVENTION

Since the lock piece is set so that a biasing force of the coil spring does not become zero even when the lock pawl is engaged in the lock opening, the lock pawl tends to rotate further over the position of the lock opening if no lock opening is provided.

Thus, when fixing the bracket for rotatably supporting the lock piece to the upper rail and when assembling the upper rail and the lower rail, the lock piece should be rotated against a biasing force of the coil spring, raising an inconvenience of degrading the workability.

In order to solve the above inconvenience, U.S. Pat. No. 5,971,342 proposes a lock mechanism wherein the coil spring is assembled after. Specifically, the bracket is fixed to the upper rail by welding to swingably arrange the operation rod therethrough. When inserting the operation rod into the bracket, the lock piece is connected to the operation rod for unitary rotation. Finally, the coil spring is assembled to rotatively bias the operation rod.

With the lock mechanism disclosed in the reference, however, the coil spring should be assembled after, leading to lowered workability. Moreover, there is a need to provide a coil-spring winding shaft for allowing the coil spring to be assembled after and a structure for preventing disengagement of the coil spring, raising an inconvenience of increasing the width of the lock mechanism.

It is, therefore, an object of the present invention to provide a lock mechanism for a seat slide device, which contributes to an enhancement in workability and a reduction in width of the mechanism. Another object of the present invention is to provide an assembling method of such lock mechanism.

The present invention provides generally a slide device for a vehicle seat, comprising: a lower rail mounted to a vehicle-body floor, the lower rail being formed with a plurality of lock openings at predetermined intervals in a longitudinal direction of the lower rail; an upper rail fixed at a lower portion of the seat, the upper rail being slidably mounted to the lower rail; a bracket fixed to the upper rail; a coil spring; a lock mechanism swingably supported to the bracket, the lock mechanism allowing slide lock of the seat in a desired position, the lock mechanism comprising a lock piece comprising a plurality of lock pawls rotatively biased by the coil spring, the lock pawls being engaged in and disengaged from the lock openings of the lower rail; a first spring protrusion formed with the bracket, the first spring protrusion catching one end of the coil spring; a lock releasing lever formed with the lock piece of the lock mechanism, the lock releasing lever catching another end of the coil spring; and a second spring protrusion formed with the lock piece of the lock mechanism, the second spring protrusion being located in the neighborhood of the first spring protrusion, the second spring protrusion catching the one end of the coil spring provisionally.

One aspect of the present invention is to provide a method of assembling a slide device for a vehicle seat, the slide device comprising: a lower rail mounted to a vehicle-body floor, the lower rail being formed with a plurality of lock openings at predetermined intervals in a longitudinal direction of the lower rail; an upper rail fixed at a lower portion of the seat, the upper rail being slidably mounted to the lower rail; a bracket; a coil spring; a lock mechanism swingably supported to the bracket, the lock mechanism allowing slide lock of the seat in a desired position, the lock mechanism comprising a lock piece comprising a plurality of lock pawls rotatively biased by the coil spring, the lock pawls being engaged in and disengaged from the lock openings of the lower rail; a first spring protrusion formed with the bracket; a lock releasing lever formed with the lock piece of the lock mechanism; and a second spring protrusion formed wit the lock piece of the lock mechanism, the second spring protrusion being located in the neighborhood of the first spring protrusion, the method comprising: catching one end of the coil spring to the lock releasing lever; catching another end of the coil spring to the second spring protrusion; fixing the bracket to the upper rail; and moving and catching the one end of the coil spring to the first spring protrusion, whereby the lock piece of the lock mechanism is biased in a lock direction after assembling the slide device.

BRIEF DESCRIPTION OF THE DRAWINGS

The other objects and features of the present invention will become apparent from the following description with reference to the accompanying drawings, wherein.

DETAILED DESCRIPTION OF THE INVENTION

Figure 1:
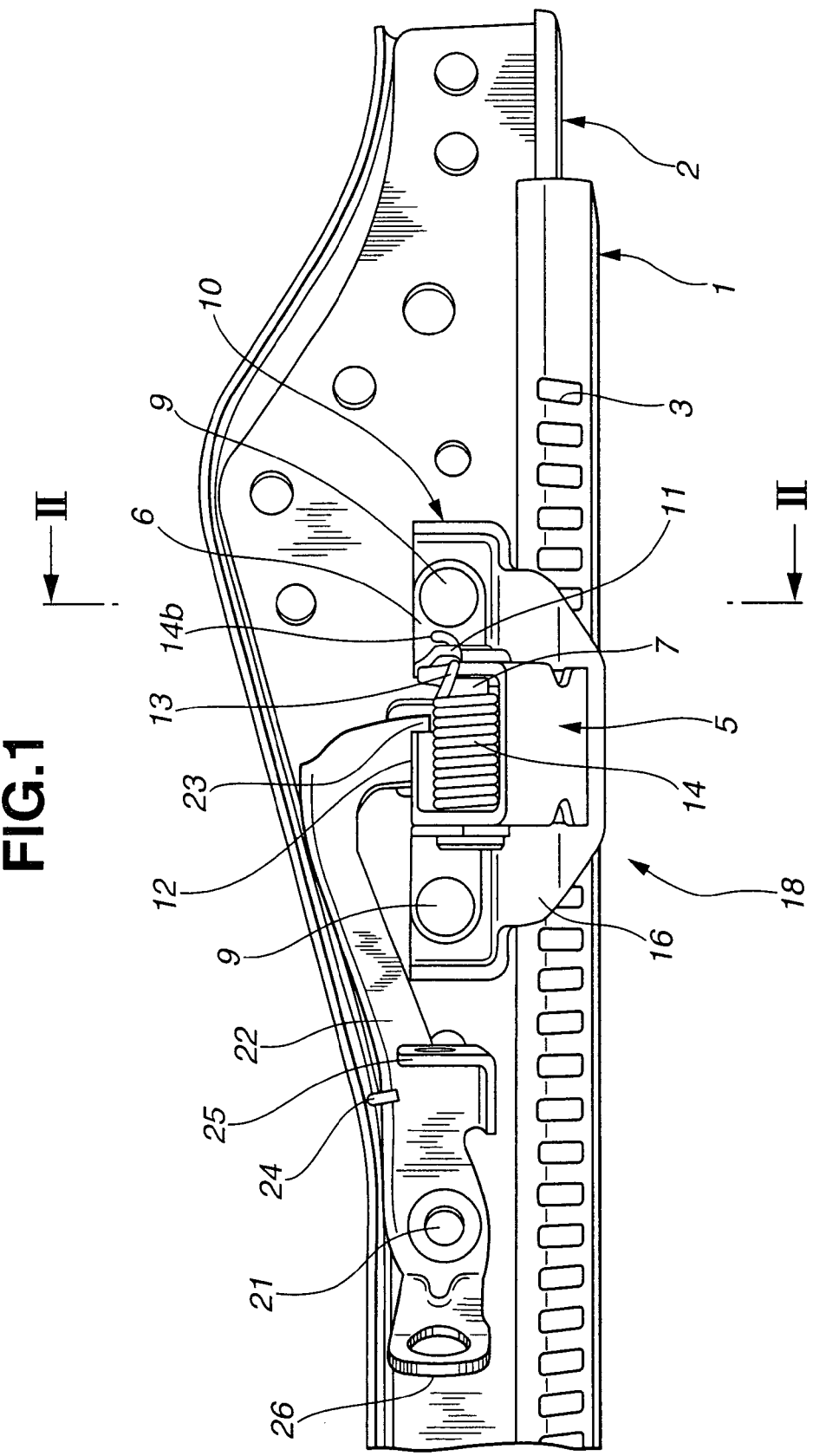
FIG. 1 is a front view showing an embodiment of a lock mechanism for a seat slide device according to the present invention.
Figure 2:
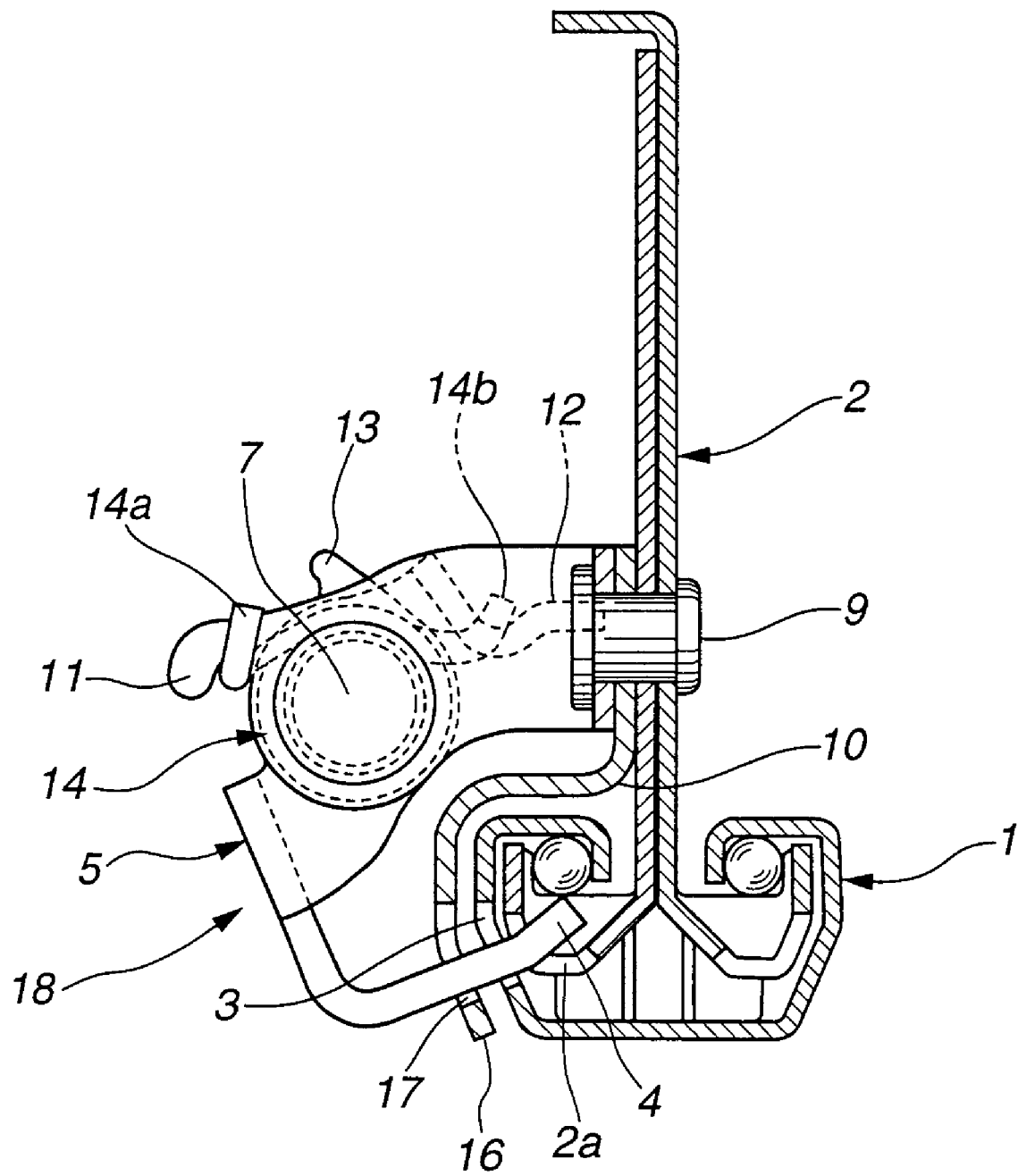
FIG. 2 is a sectional view taken along the line II—II in FIG. 1.

Referring to the drawings, a description is made about a lock mechanism for a seat slide device embodying the present invention. Referring to FIGS. 1 and 2, a lock mechanism 18 comprises a lower rail 1 fixed to a vehicle-body floor, not shown, through a mounting member and an upper rail 2 engaged therewith to be slidable in the right and left direction as viewed in FIG. 1. A seat cushion, not shown, is connected to the upper rail 2.

Figure 3:
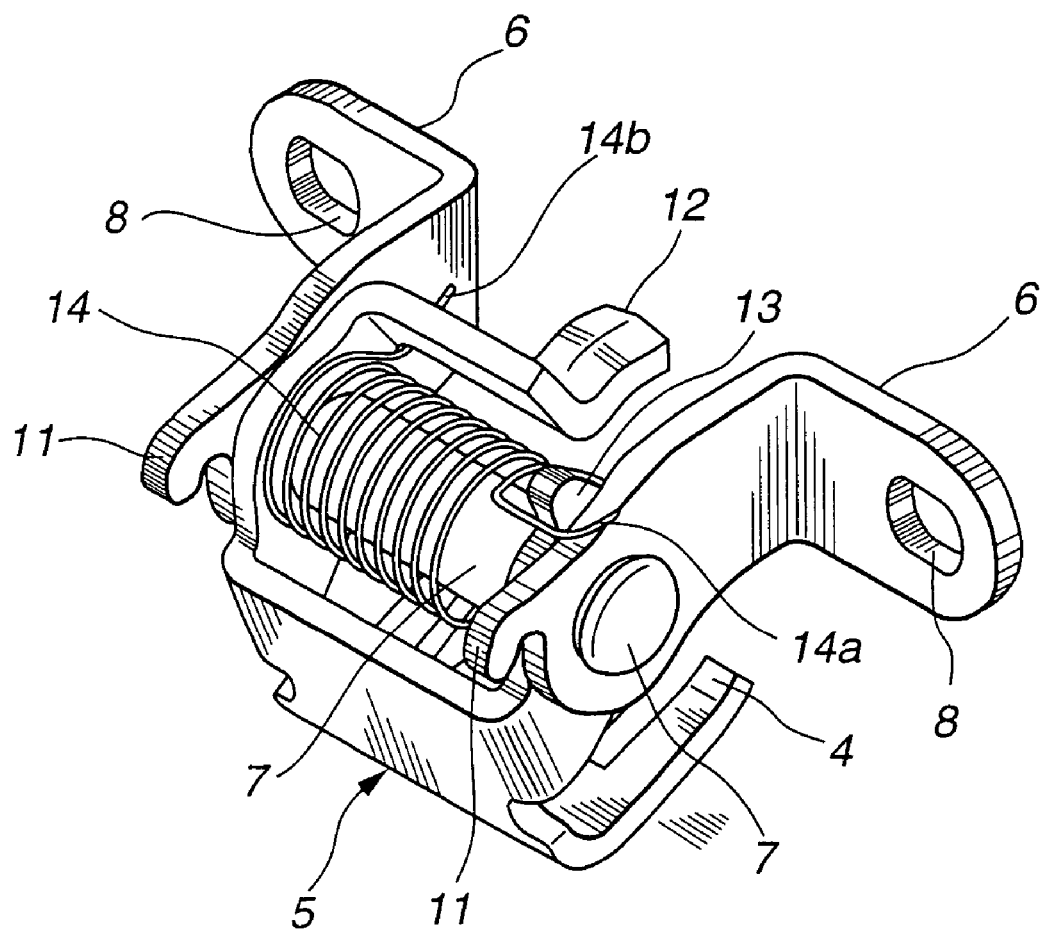
FIG. 3 is a perspective view showing the lock mechanism.

Lock openings 3 are formed in a side face of the lower rail 1 at predetermined intervals in the longitudinal direction thereof. Likewise, lock openings 2a are formed in a lower part of the upper rail 2 at predetermined intervals in the longitudinal direction thereof. Referring to FIG. 3, a lock piece 5 having lock pawls 4 engaged/disengaged from the lock openings 3, 2a is rotatably supported to a pair of brackets 6 through a shaft 7. The pair of brackets 6 comprises a pair of symmetrical L-shaped members, each having one end formed with an assembling opening or slot 8. As shown in FIG. 2, with the assembling opening 8 aligned to a pin hole formed in the upper rail 2, a pin 9 is inserted therein, then caulked directly or together with a mounting seat 10, achieving fixing of the bracket 6 at a side face of the upper rail 2. Another end of the bracket 6 is formed with a (first) spring protrusion 11 and a hole for receiving the shaft 7.

As shown in FIG. 3, the lock piece 5 comprises a C-shaped member supported on the shaft 7 to be rotatable thereabout, and is formed with a lock releasing lever 12 facing the lock pawls 4 and a provisional or second spring protrusion 13 on the side opposite to the lock releasing lever 12. The provisional spring protrusion 13 is located in the neighborhood of the spring protrusion 11.

Wound on the shaft 7 is a coil spring 14 having one end 14a caught to the provisional spring protrusion 13 and another end 14b caught to a base of the lock releasing lever 12. With this, a biasing force of the coil spring 14 does not work in the direction of rotating the lock piece 5, so that the lock piece 5 and the brackets 6 are in rotatable relation. For obtaining a biasing force of the coil spring 14 acting on the lock piece 5, one end 14a of the coil spring 14 is moved and caught to the spring protrusion 11.

Figure 4:
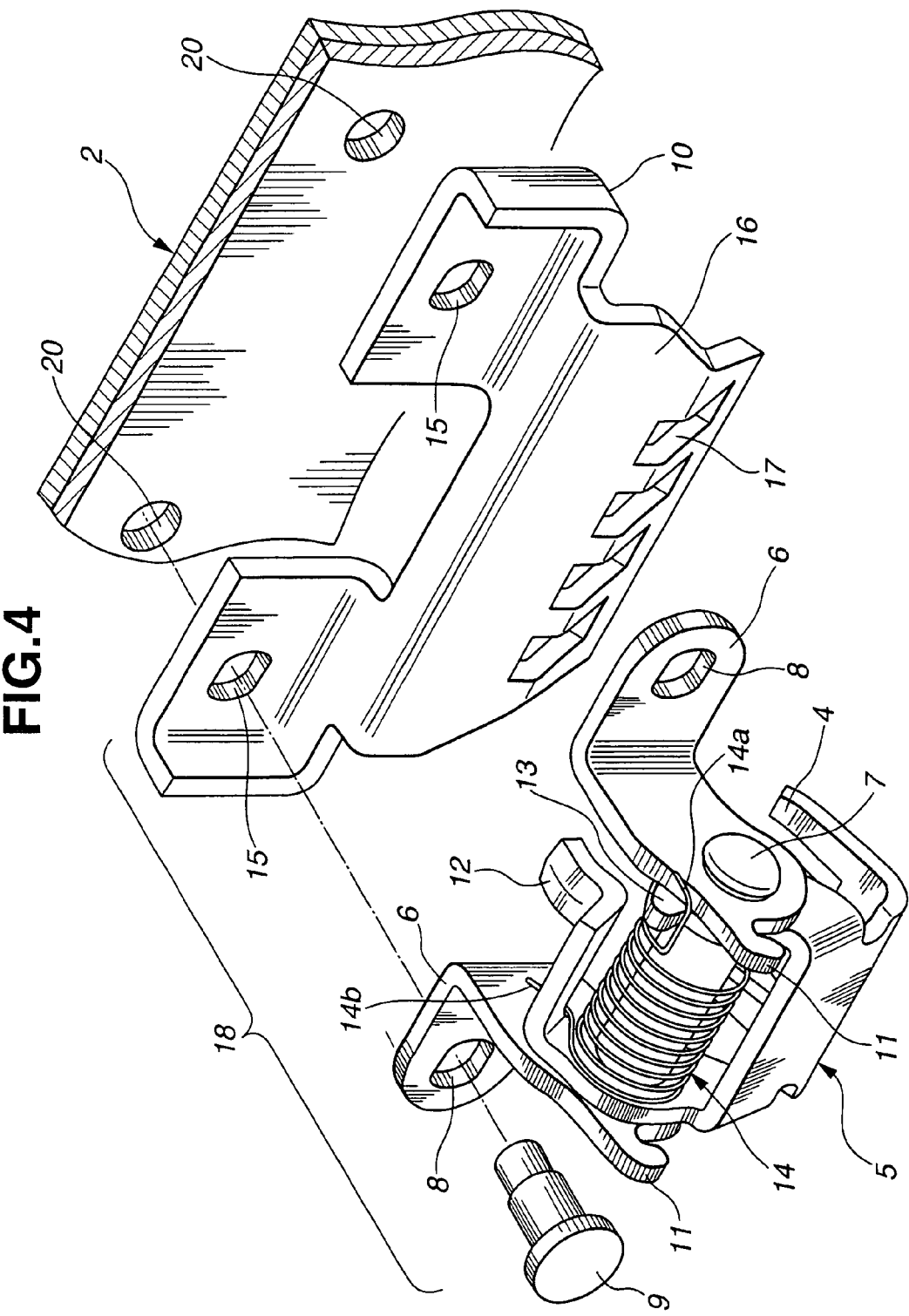
FIG. 4 is an exploded perspective view showing the lock mechanism.

Referring to FIG. 4, the mounting seat 10 comprises a bent member having assembling openings or slots 15 corresponding to the assembling openings 8 of the brackets 6. A skirt 16 is integrated with the mounting seat 10 to face the lock piece 5 and extend along a side face of the lower rail 1. The skirt 16 is formed with guide openings 17 from which the lock pawls 4 of the lock piece 5 are engaged/disengaged. The guide openings 17 are roughly the same in shape as the lock openings 3, and are the same in number as the lock openings 2a.

Thus, by previously connecting the brackets 6 to the mounting seat 10 through the pins 9, the lock mechanism 18 comprising the lock piece 5 and the coil spring 14 can be constructed as a unit. The pin 9 is inserted into an assembling opening or circular hole 20 of the upper rail 2, then caulked for fixing.

Fixing of the lock mechanism 18 to the upper rail 2 is carried out with one end 14a of the coil spring 14 fixed provisionally or caught to the provisional spring protrusion 13 as descried above. Thus, during work for fixing the brackets 6 and the mounting seat 10 to the upper rail 2 through the pins 9, the lock piece 5 is rotatable with respect to the shaft 7 without being biased rotatively. Therefore, the lock pawls 4 are not forcibly engaged in the guide openings 17 and the lock opening 3, facilitating adjustment of the mounting position of the brackets 6, allowing accurate positioning thereof. Moreover, since the assembling openings 8 are slots, the brackets 6 can be adjusted positionally with respect to the mounting seat 10 through rightward and leftward displacement.

When the pins 9 are fixed to the upper rail 2 by caulking to fix the brackets 6 and the mounting seat 10, then, one end 14a of the coil spring 14 is disengaged from the provisional spring protrusion 13 and moved to the spring protrusion 11 of the bracket 6, a biasing force of the coil spring 14 acts on the lock piece 5 to have the lock pawls 4 engaged in the guide openings 17 and the lock openings 3. With this, when compared with the lock piece 5 being biased by the coil spring 14 from the beginning, the lock pawls 4 can be prevented from excessively rotating toward the guide openings 17 and the lock openings 3 during assembling, allowing fulfillment of assembling without having any interference of the lock piece 5, resulting in enhanced assembling-ability.

As shown in FIG. 1, the lock releasing lever 12 of the lock piece 5 is arranged so that when depressed by a hooked end 23 of an operation lever 22 swingably supported on a side face of the upper rail 2 through a shaft 21, the lock piece 5 is rotated against a biasing force of the coil spring 14 to have the lock pawls 4 disengaged from the lock openings 3 so as to release slide lock. The operation lever 22 is biased clockwise as viewed in FIG. 1 by a spring 24 to hold the hooked end 23 always abutting on the lock releasing lever 12. A biasing force of the coil spring 14 is set to be sufficiently larger than that of the spring 24. Annular engagements 25, 26 are formed with the operation lever 22 to receive and connect an operation rod, not shown, extending forward downward of the seat cushion.

Thus, when pulling the operation rod upward through the lower portion of the seat cushion, the operation rod 22 is rotated to have the hooked end 23 depressing the lock releasing lever 12. And the lock piece 5 is rotated about the shaft 7 to have lock pawls 4 disengaged from the lock openings 3, releasing slide lock. On the other hand, when releasing the operation rod, the operation lever 22 is returned to an original position by a biasing force of the coil spring 14 against a biasing force of the spring 24, so that the hooked end 23 is pushed back by the lock piece 5 to stand still at a lock position in the state abutting on the lock releasing lever 12. And the lock pawls 4 of the lock piece 5 are engaged in the lock openings 3, obtaining slide lock.

In the illustrative embodiment, when applying an impact force due to front or rear collision, the front and rear part of the lock pawls 4 are supported not only on the end faces of the lock openings 3, but also on the end faces of the guide openings 17 and the lock openings 2a, preventing deformation of the lock piece 5, resulting in enhanced engagement strength. In this connection, it is noted that such effect can considerably be obtained with the guide openings 17 only.

According to the present invention, assembling of the lock piece and the coil spring to the brackets allows a unit construction of the lock mechanism. When assembling to the upper rail the lock mechanism constructed as a unit, one end of the coil spring is caught to the provisional spring protrusion so that the lock piece is not biased rotatively, i.e. the lock pawls are not rotated in the lock direction, resulting in excellent assembling-ability. Moreover, when assembling is finished, one end of the coil spring is moved from the provisional spring protrusion to the spring protrusion, allowing appropriate rotative biasing to the lock piece.

Further, according to the present invention, the structure of the mounting seat which can hold the brackets and the shaft in the rigid state contributes to an enhancement in a unit construction of the lock mechanism. Moreover, the possibility of positional adjustment of the mounting seat and the brackets with respect to the upper rail allows assembling with the lock pawls accurately engaged in the guide openings.

Furthermore, according to the present invention, since the lock mechanism can be assembled to the upper rail with a biasing force of the coil spring failing to act on the lock piece, i.e. with the lock pawls failing to automatically be engaged in the lock openings, adjustment of the assembling position of the brackets for supporting the lock piece can be carried out easily. Moreover, moving one end of the coil spring allows easy and appropriate setting of a biasing force thereof with respect to the lock piece after assembling.

Having described the present invention in connection with the preferred embodiment, it is noted that the present invention is not limited thereto, and various changes and modifications can be made without departing from the scope of the present invention.

The entire teachings of Japanese Patent Application P2002-210527 filed Jul. 19, 2002 are hereby incorporated by reference.

What is claimed is:

1. An arrangement, comprising:
   a lower rail mounted to a vehicle-body floor, the lower rail being formed with a plurality of lock openings at predetermined intervals in a longitudinal direction of the lower rail;
   an upper rail fixed at a lower portion of a vehicle seat, the upper rail being slidably mounted to the lower rail;
   a bracket fixed to the upper rail;
   a coil spring;
   a lock mechanism swingably supported to the bracket, the lock mechanism allowing slide lock of the seat in a desired position, the lock mechanism comprising a lock piece comprising a plurality of lock pawls rotatively biased by the coil spring, the lock pawls being engaged in and disengaged from the lock openings of the lower rail;
   a first spring protrusion formed with the bracket, the first spring protrusion catching a first end of the coil spring;
   a lock releasing lever formed with the lock piece of the lock mechanism, the lock releasing lever catching a second end of the coil spring; and
   a second spring protrusion formed with the lock piece of the lock mechanism, the second spring protrusion being located in the neighborhood of the first spring protrusion, the second spring protrusion catching the first end of the coil spring provisionally.

2. The arrangement as claimed in claim 1, wherein the bracket comprises a pair of symmetrical L-shaped members holding therebetween a shaft for swingably supporting the lock piece of the lock mechanism, and a mounting seat for positionally adjustably mounting the L-shaped members to the upper rail.

3. The arrangement as claimed in claim 2, wherein the mounting seat comprises a skirt extending downward to face the lock openings of the lower rail, the skirt being formed with a plurality of guide openings corresponding to the lock openings.

4. An arrangement, comprising:
   a lower rail mounted to a vehicle-body floor, the lower rail being formed with a plurality of lock openings at predetermined intervals in a longitudinal direction of the lower rail;
   an upper rail fixed at a lower portion of a vehicle seat, the upper rail being slidably mounted to the lower rail;
   a bracket fixed to the upper rail;
   a coil spring;
   means swingably supported to the bracket for allowing slide lock of the seat in a desired position, the slide lock allowing means comprising a lock piece comprising a plurality of lock pawls rotatively biased by the coil spring, the lock pawls being engaged in and disengaged from the lock openings of the lower rail;
   a first spring protrusion formed with the bracket, the first spring protrusion catching a first end of the coil spring;
   a lock releasing lever formed with the lock piece of the slide lock allowing means, the lock releasing lever catching a second end of the coil spring; and
   a second spring protrusion formed with the lock piece of the slide lock allowing means, the second spring protrusion being located in the neighborhood of the first spring protrusion, the second spring protrusion catching the first end of the coil spring provisionally.

5. A method of assembling an arrangement for a vehicle seat, the arrangement comprising:
   a lower rail mounted to a vehicle-body floor, the lower rail being formed with a plurality of lock openings at predetermined intervals in a longitudinal direction of the lower rail;
   an upper rail fixed at a lower portion of the vehicle seat, the upper rail being slidably mounted to the lower rail;
   a bracket;
   a coil spring;
   a lock mechanism swingably supported to the bracket, the lock mechanism allowing slide lock of the seat in a desired position, the lock mechanism comprising a lock piece comprising a plurality of lock pawls rotatively biased by the coil spring, the lock pawls being engaged in and disengaged from the lock openings of the lower rail;
   a first spring protrusion formed with the bracket;
   a lock releasing lever formed with the lock piece of the lock mechanism; and
   a second spring protrusion formed with the lock piece of the lock mechanism, the second spring protrusion being located in the neighborhood of the first spring protrusion,
   the method comprising:
      catching a second end of the coil spring to the lock releasing lever;
      catching a first end of the coil spring to the second spring protrusion;
      fixing the bracket to the upper rail; and
      moving and catching the first end of the coil spring to the first spring protrusion,
      whereby the lock piece of the lock mechanism is biased in a lock direction after assembling the slide device.

6. The method as claimed in claim 5, wherein the bracket comprises a pair of symmetrical L-shaped members holding therebetween a shaft for swingably supporting the lock piece, and a mounting seat for positionally adjustably mounting the L-shaped members to the upper rail.

7. The method as claimed in claim 6, wherein the mounting seat comprises a skirt extending downward to face the lock openings of the lower rail, the skirt being formed with a plurality of guide openings corresponding to the lock openings.

* * * * *